Nov. 29, 1966    O. VOEGELI    3,288,942
TRANSDUCER DEVICE
Filed Dec. 23, 1963
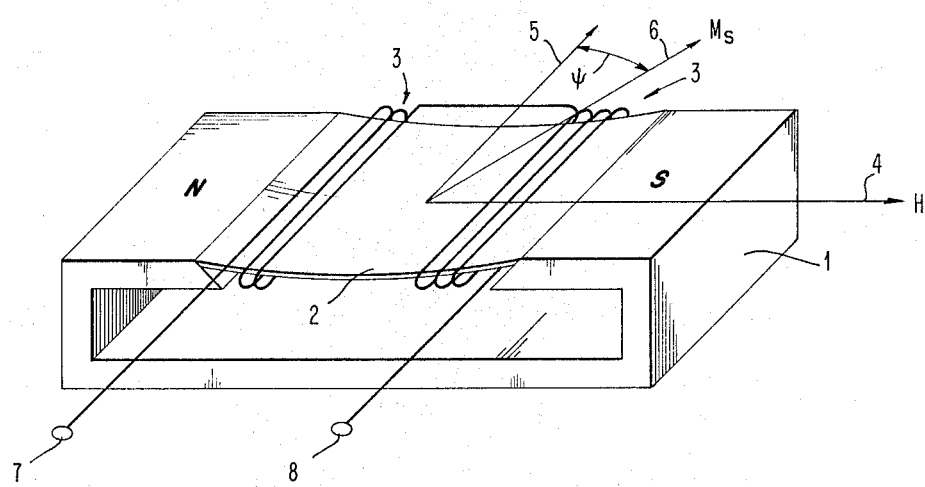
INVENTOR
OTTO VOEGELI
BY *John J. Goodwin*
ATTORNEY

United States Patent Office 3,288,942
Patented Nov. 29, 1966

3,288,942
TRANSDUCER DEVICE
Otto Voegeli, Lafayette, Ind., assignor to International Business Machines Corporation, New York, N.Y., a corporation of New York
Filed Dec. 23, 1963, Ser. No. 332,703
11 Claims. (Cl. 179—110)

The present invention relates to a device for translating mechanical energy to electrical energy and more particularly to a device for translating mechanical into electrical energy by means of strains induced in a magnetostrictive transducer.

Heretofore, it has been known that materials having magnetostrictive properties may be effectively employed as transducers for translating mechanical energy into electrical energy and vice versa. The term "magnetostriction" literally implies magnetic contraction, but is generally understood to include a number of closely allied phenomena relating to ferromagnetic substances under magnetic influence. Of particular interest is the inverse magnetostrictive effect, which is the change in the state of magnetization of a ferromagnetic member when it is subjected to mechanical strain.

A typical transducer utilizing the inverse magnetostrictive effect generally includes a membrane of magnetostrictive material disposed with a magnetic field so that magnetic flux vectors are produced therein. Pick-up coils, such as wire helices, are placed about the magnetostrictive membrane. When the magnetostrictive membrane is mechanically stressed, the magnetization of the membrane varies proportionally to the stress. The variation of magnetization of the membrane within the magnetic field of the permanent magnet causes a current to be induced in the pick-up coils. The current in the pick-up coils is therefore representative of the original mechanical stress applied to the membrane.

Since the mechanical stress of the magnetostrictive membrane may be produced by acoustical energy, such transducers are commonly used as magnetostrictive microphones and hydrophones. A drawback associated with magnetostrictive transducers is that they are not as sensitive as electro-dynamic types. The advantages of magnetostrictive transducers are that they are compact, require few component parts, and need no associated power supply. It is therefore desirable that a magnetostrictive transducer be provided which exhibits relatively high sensitivity and linearity.

An object of the present invention is to provide an improved magnetostrictive transducer for use as a microphone and the like.

Another object of the present invention is to provide a magnetostrictive transducer which exhibits relatively high sensitivity and linearity.

A further object of the present invention is to provide a magnetostrictive transducer having a membrane which is uniaxially anisotropic.

A still further object of the present invention is to provide a magnetostrictive transducer having a magnetic thin film membrane.

The foregoing and other objects, features and advantages of the invention will be apparent from the following more particular description of a preferred embodiment of the invention, as illustrated in the accompanying drawings.

In the drawings:

FIG. 1 is a perspective view of the essential elements of an embodiment of a magnetostrictive transducer according to the principles of the present invention.

A significant feature of the magnetostrictive transducer depicted in FIG. 1 is that the membrane employed has the property of being uniaxially anisotropic. Anisotropy refers to the dependence of magnetic properties on direction, that is, the tendency of crystals of matter to be more easily magnetized in one direction rather than another. The direction in which the ease of magnetization is greatest is referred to as the "easy axis," which is a property of the material. For example, in iron crystals which are generally cubic, the easy axis is parallel to the direction of a cubic axis, and in nickel, which also has cubic crystals, it is parallel to the body diagonal of the cube. Anisotropy is, therefore, a vector quantity, having both scaler and directional properties.

Ferromagnetic substances and alloys, particularly those which have heretofore been employed for the membranes of magnetostrictive transducers, can be regarded as an assemblage of small permanent magnets. When the material or alloy is unmagnetized, the small magnets are arranged with haphazard or random orientations; when magnetized by placing the material in a magnetic field, the small magnets line up with their axes approximately parallel. According to domain theory, in the unmagnetized material groups of the aforesaid small magnets form into groups referred to as domains, each of which consists of many atoms. Within a domain all the atoms are aligned parallel, however, the orientations of the separate domains are random. When the material is placed in a magnetic field, the atoms turn together in groups (each atomic magnet about its own axis), the atoms in each group remaining parallel to each other so that they are aligned more nearly with the magnetic field applied to the material.

In the typical magnetostrictive transducer, the magnetostrictive membrane (such as iron-nickel alloy) is placed in the magnetic field of a permanent magnet and the atomic magnets of the material rotate in the direction of the field of the permanent magnet. When mechanical stress is applied to the membrane, for example by acoustical energy, the magnetization of the membrane changes causing a corresponding rotation of the atomic magnets. The greater stress applied the greater will be the angle of rotation of the atomic magnets from their position prior to stress being applied. The rotation of the atomic magnets in the permanent magnetic field causes flux changes. A pick-up coil is wound about the membrane so that the flux changes causes a current to flow in the coil which is proportional to the magnitude of the flux change and therefore to the magnetic of the mechanical stress. In this fashion an electrical signal may be produced which is representative of acoustical energy, and the transducer operates as a microphone.

As previously stated, the direction of the easy axes of the atomic magnets are originally haphazard and random. Thus when the material is stressed, the atomic magnets in the individual domains rotate incoherently. This incoherent rotation causes varying stray fields along the borderlines (magnetic walls) of the domains. These stray fields are opposing the rotation; the resulting process is known as incoherent or partial rotation and is associated with a high hysteresis. Hence the resulting flux change detected by the pick-up coil is not as large as ideally desired.

In the present invention an improved magnetostrictive transducer is provided wherein the magnetostrictive membrane contains atomic magnets (or domains) having their easy axes all aligned in parallel rather than in random orientation, and may be considered as having a single domain. The magnetostrictive membrane having domains with such parallel easy axes is then placed in a permanent magnetic field at right angles to the easy direction and the atomic magnets rotate and become orientated at a given angle with the direction of the permanent magnetic field. The resultant direction of the atomic magnets is referred to as the steady state direction of magnetization. When mechanical stress is applied to the membrane of the present invention, the magnetic vectors of all the atoms of the membrane will rotate coherently through a common angle. No stray fields are therefore opposing the rotation and the flux change detected by the pick-up coil is a maximum. The magnetostrictive membrane of the present invention can be considered as having a total magnetic vector which has a magnitude equal to the scale sum of the magnitudes of each of the individual atomic magnet vectors since the angle between the easy axis of each of the individual atomic magnet vectors is zero.

The total magnetic vector of the membrane of the present invention being maximum, the resultant currents produced by given mechanical stresses will also be maximum and the sensitivity of the transducer of the present invention is greater than of those heretofore devised.

The magnetic material employed for the membrane in the present invention, wherein the easy axis of all the atomic magnets are in parallel, will be herein referred to as being uniaxially anisotropic. Material which is highly suitable for use as the magnetostrictive membrane in the transducer of the present invention is referred to in the art as a "magnetic thin film." Magnetic thin films are films wherein the inherent self demagnetization force is less than the inherent coercive force. Thin films are generally composed of iron-ickel alloys (therefore being magnetostrictive) and have thicknesses in the range of from 100 to 5,000 Angstroms. Thin films are produced by evaporating iron and nickel or an iron-nickel alloy in a vacuum and causing the evaporation to deposit on a suitable substrate. The evaporation takes place within a provided magnetic field which produces a film having uniaxial magnetic anisotropy as previously described. Thus a magnetic thin film has the necessary uniaxial anisotropy and is also thin, which renders it easily stressed by slight acoustical pressures, thereby adding to the linearity and sensitivity of the transducer with which it is employed.

Referring to FIG. 1, an embodiment of a magnetostrictive transducer useful as a microphone is shown. Only the necessary functional elements are shown, namely the permanent magnet 1 for providing the magnetic field, the uniaxial anisotropic magnetostrictive membrane 2, and the pick-up coils 3. Other microphone elements such as the casing, support cone, and spider, etc., have been omitted for clarity and because these elements are matters of design and not germane to the invention.

The uniaxial anisotropic magnetostrictive membrane 2 is affixed at its ends to the north and south poles of permanent magnet 1, which has a magnetic field in the direction indicated by arrow 4 and of strength H. The pick-up coils 3 are wound about membrane 2 in close proximity thereto. The easy axes of all the atomic magnets of the membrane are uniaxial, being in the direction indicated by the arrow 5. The presence of the permanent magnetic field causes all the atomic magnets (and/or domains) to rotate a like amount, indicated by the arrow 6. The arrow 6 may be considered a vector referred to as the steady state magnetization $M_s$ of the membrane 2. Vector $M_s$ represents the direction of the domains of the membrane 3 after being rotated away from the easy direction 5 by the permanent magnetic field H (arrow 4 in FIG. 1). The $M_s$ vector 6 is at a given angle $\psi$ with respect to the easy direction 5. The angle $\psi$ is a function of the type of magnetostrictive material employed for membrane 2, the strenth of the magnetic field H, the initial stress of the membrane 2, etc. A component of the saturization magnetization $M_s$ equal to $M_s$ sine $\psi$ is parallel to the H vector 4 and therefore is at right angles to the turns of the coil 3.

When membrane 3 is additionally stressed, for example by acoustical energy, the magnetization of membrane 3 varies accordingly and the orientation of the domains equally change an angular amount $\Delta\psi$. The component of magnetization change at right angles to the coils 3 (i.e., $\Delta\psi$) causes a resultant flux change which induces an e.m.f. in coils 3 which appears across output terminals 7 and 8.

The expression for the output signal for a typical transducer is as follows:

$$E = -N\frac{d\phi}{dt} \quad (1)$$

$$E = -N \cdot M_s \cdot A \frac{d \text{ sine } \psi}{dt} \quad (2)$$

$$E = N \cdot M_s \cdot A \left( \frac{HM_s}{2K + Be} - \frac{HM_s}{2K} \right) \quad (3)$$

$$E = -N\omega M_s^2 AH \left( \frac{Be}{2K[K - Be]} \right) 4\pi \ 10^{-8} \quad (4)$$

where $N$ = turns of coil 3
$\omega = 2\pi f$; $f$ = frequency of applied cyclical stress (i.e., sound pressure)
$M_s$ = saturation magnetization
$A$ = breadth × thickness of membrane 2
$H$ = field strength of magnet 1
$B$ = magneto-elastic constant
$e$ = stress in membrane 2 caused by sound pressure
$K$ = constant of the effective uniaxial anisotropy Typical values for the aforesaid parameters are as follows:

$N = 6 \times 10^3$ turns
$\omega = 2\pi 10^3$ cycles per second
$M_s = 995$
$A = 3 \cdot 10^{-4}$
$H = 1.5$
$B = 41.4 \times 10^6$
$e = 3.5 \times 10^{-7}$
$K = 200$ Inserting these values into Equation 4 the output signal E is computed to be 413 millivolts based on a stresse of $3.5 \times 10^{-7}$ due to an applied pressure of one dyne. The magnetostrictive membrane in the above example is composed of 65% iron and 35% nickel.

It is seen therefore that the present invention provides an improved transducer which may be used as a microphone and for other mechanical energy to electrical energy conversion. The transducer includes a magnetostrictive membrane having the property of uniaxial anisotropy so that the individual domains initially are all aligned in the same direction, i.e., the easy direction. When the membrane is placed in a magnetic field at right angles to the easy direction, all the domains rotate the same amount in the same direction as if the membrane was a single domain. When external stress is applied to the membrane, all the domains rotate the same amount in the same direction with the result that the signal induced in a pick-up coil surrounding the membrane is a maximum. Thus, the transducer of the present invention may be used as a highly sensitive and linear magnetostrictive microphone.

It is understood that a variety of different transducers having different characteristics and operating specifications may be provided in accordance with the principles of the present invention by choosing different types of magnetostrictive alloys and different dimensions for the membrane, by the amount of permanent magnetic field strength selected, the number of turns of pick-up coil, etc.

For example, it is not entirely necessary that the magnetostrictive membrane be placed in the magnetic field with the direction of the easy axes normal to the direction of the magnetic field. This is the case for alloys having positive magnetostriction. If an alloy having negative magnetostriction were used for the membrane, the membrane would be placed in the magnetic field such that the easy axes are in parallel with the direction of the magnetic field.

While the invention has been particularly shown and described with reference to a preferred embodiment thereof, it will be understood by those skilled in the art that various changes in form and details may be made therein without departing from the spirit and scope of the invention.

What is claimed is:

1. A transducer for converting mechanical to electrical energy comprising:
   means for establishing a magnetic field,
   a body of magnetostrictive material disposed in said magnetic field, said body having the easy axes of all the domains thereof in parallel,
   and a pick-up coil associated with said body of magnetostrictive material.

2. A transducer according to claim 1 wherein said body of magnetostrictive material is disposed in said magnetic field such that parallel easy axes of said domains are normal to the direction of said magnetic field.

3. A transducer according to claim 1 wherein said body of magnetostrictive material is unaxially anisotropic.

4. A transducer according to claim 1 wherein the magnetization vectors of each of said domains of said magnetostrictive material are rotated a like amount and become aligned in the same direction due to said magnetic field.

5. A transducer according to claim 3 wherein the body of magnetostrictive material is a thin magnetic film.

6. A transducer according to claim 3 further including means for applying mechanical stress to said magnetostrictive material for varying the orientation magnetization vectors of each of said domains the same amount in the same direction, and wherein a signal is produced in said pick-up coil due to said varying magnetization, said signal being representative of said mechanical stress.

7. A magnetostrictive microphone comprising:
   a permanent magnet having positive and negative pole pieces for establishing a magnetic field therebetween,
   a membrane of magnetostrictive material affixed to said pole pieces and disposed in said magnetic field, said membrane having the easy axes of all the domains thereof in parallel and normal to the direction of said magnetic field,
   and a pick-up coil wound around said membrane.

8. A magnetostrictive microphone according to claim 7 wherein said magnetic field causes a stress within said membrane.

9. A microphone according to claim 6 wherein said membrane is unaxially anisotropic.

10. A microphone according to claim 7 wherein the magnetization vectors of said domains of said membrane are rotated a like amount and become aligned in the same direction due to said magnetic field.

11. A microphone according to claim 8 wherein stresses occur in said membrane in response to acoustical energy directed thereon,
    said stresses causing the orientation of the magnetization vectors of each of said domains to rotate the same amount in the same direction,
    and wherein said rotation of said magnetization vectors produce a signal in said pick-up coil representative of said acoustical energy.

No references cited.

KATHLEEN H. CLAFFY, *Primary Examiner.*

F. N. CARTEN, *Assistant Examiner.*